Patented May 19, 1931

1,806,137

UNITED STATES PATENT OFFICE

BYRON L. WEST, OF HAMBURG, NEW YORK, ASSIGNOR TO NATIONAL ANILINE AND CHEMICAL COMPANY, INC., OF NEW YORK, N. Y., A CORPORATION OF NEW YORK

DISAZO DYE

No Drawing.   Application filed April 12, 1930. Serial No. 443,922.

This invention relates to the production of a new disazo dyestuff which is of value for dyeing wool and other animal fibres. Material, e. g., textile fibres, dyed with the new disazo dyestuff also forms a part of the present invention.

The new disazo dyestuff of the present invention can be prepared by first coupling one molecular proportion of diazotized 1-amino-benzene-3-sulfonic acid with one molecular proportion of 1.8-aminonaphthol-4-sulfonic acid to produce a monazo dyestuff as an intermediate product, and then coupling into this intermediate product one molecular proportion of diazotized 4-nitro-1-aminobenzene, the first coupling being preferably effected in acid solution whilst the second coupling is preferably carried out in alkaline solution.

The following specific example will further illustrate the invention, the parts being by weight.

*Example.*—19.5 parts of the sodium salt of 1-aminobenzene-3-sulfonic acid are dissolved in 175 parts of water and diazotized in the usual manner at a temperature of 0°–5° C. by means of 7 parts of sodium nitrite (98.6 per cent. pure) and 28 parts of hydrochloric acid, sp. gr. 1.14, care being taken to avoid the presence at the completion of the diazotization of more than a very slight excess of nitrous acid. The resulting diazo solution is then added, with stirring, to a suspension of 23.9 parts of finely divided 1.8-aminonaphthol-4-sulfonic acid in 350 parts of water, the temperature being maintained at 0°–5° C. As soon as the formation of the intermediate monazo dyestuff is complete, the solution is rendered faintly alkaline, i. e., a sodium bicarbonate alkalinity, by the addition of sodium carbonate, and a solution of diazotized 4-nitro-1-aminobenzene (p-nitraniline), previously prepared in any suitable and well-known manner by diazotizing 13.8 parts p-nitraniline by means of 7 parts of sodium nitrite (98.6 per cent, pure), 30 parts of hydrochloric acid, sp. gr. 1.14, and 120 parts water, is then added. During the final coupling, the temperature is maintained at 0°–4° C., and sufficient sodium bicarbonate is added to the mixture from time to time to maintain a bicarbonate alkalinity. The coupling takes place rapidly, and when complete, the mixture is slowly heated to about 95° C., sodium chloride, about 30 parts, are added to salt out the dyestuff, and the mixture then cooled to about 85° C. and the dyestuff filtered off, and dried.

The new disazo dyestuff thus produced is the sodium salt of an acid having, in the free state, the following probable formula:

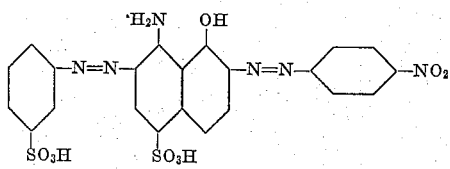

in the dry and pulverized state, and in the form of its sodium salt, it is brownish black powder soluble in water giving a blue black solution, and soluble in concentrated sulfuric acid forming a green solution which upon dilution with water gives a purple to violet solution. The new dyestuff from a neutral or acid bath dyes wool, silk and other animal fibres black shades of excellent fastness to light and washing. It stains celanese (acetyl-silk) only slightly.

I claim:

1. As a new product, the disazo dyestuff having in the free state the following probable formula:

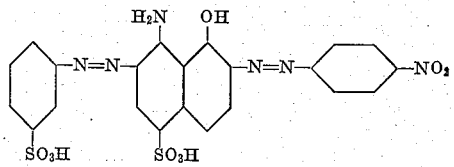

said dyestuff in the dry and pulverized state, and in the form of its sodium salt, being a brownish black powder, and dyes wool from an alkaline bath black shades.

2. Material dyed with the dyestuff of claim 1.

In witness whereof I have hereunto set my hand.

BYRON L. WEST.